൩,൩08,027
Patented Mar. 7, 1967

3,308,027
BOVINE PITUITARY GROWTH HORMONE
PROCESS
Fritz Reusser, Portage, Mich., assignor to The Upjohn Company, Kalamazoo, Mich., a corporation of Delaware
No Drawing. Filed May 13, 1965, Ser. No. 455,598
1 Claim. (Cl. 167—74)

This invention relates to the biologically active principle obtained from bovine pituitary glands known as growth hormone and to procedures for advantageously modifying such growth hormone principle.

Because of its property and ability to stimulate anabolic reactions in the animal body the growth hormone from the said pituitary glands has been the object of considerable study and remains of interest and importance to those skilled in the art. Data heretofore obtained in the study of bovine growth hormone point to a molecular weight of about 45,000. Such a high molecular weight of a material of protein nature is a cause for some concern and a biologically active growth hormone factor with lesser molecular weight gives promise of being more useful because of the possibility of a smaller incidence of unfavorable side reactions such as anaphylaxis. Smaller molecular weight material is also useful in structural studies and synthetic work. Consequently, the separation of bovine growth hormone into biologically active material of lesser molecular weight is a desideratum of those working in this area.

It has now been found according to the present invention that bovine growth hormone can be processed into two components with different molecular weights but with some similar physical-chemical properties and with retained biological activity when assayed according to methods known to those skilled in the art. Hence, the present invention provides a process of separating bovine growth hormone into two protein substances of different molecular weights by exclusion chromatography of an ammoniacal solution thereof on a cross-linked dextran gel having a water retaining value of about 2.5 gm. per gm.

As used herein the term "bovine growth hormone" means the material known to those skilled in the art prepared, for example, according to the Wilhelmi technique, Wilhelmi, Hypophyseal Growth Hormone, Nature and Actions, Smith et al., Editors, pp. 55–69, McGraw-Hill, New York city, New York, 1955, and further purified according to Reusser, Arch. Biochem. Biophys. 106, 410–414 (1964). Such bovine growth hormone showed homogeneity in various starch gel electrophoresis systems and by N-terminal amino acid analyses, Reusser, ibid. As used herein cross-linked dextran gel means the non-ionic cross-linked gel prepared from native dextran according to the methods of U.S. Patent 3,200,823. A cross-linked dextran gel known as Sephadex is available from Pharmacia Fine Chemicals, Inc., Piscataway, New Market, New Jersey, U.S.A. The particular form having a water-regain value of about 2.5 gm. of water per gm. of dry gel is used in the present process. Its particle size varies from about 100 to 270 U.S. mesh.

Generally described, the process involves preparation of a solution of bovine growth hormone of from about 1% to about 2% by weight in aqueous ammonia no stronger than about 0.05 molar. The solution is applied to the cross-linked dextran gel preferably a column of the gel which has been pre-washed with purified water U.S.P. and poured into columns having a diameter of about 2 cm. and a bed height of about 40 cm. Elution is carried out with purified water U.S.P. of either the distilled or deionized variety at a flow rate of about 1 ml. per minute. Effluent fractions of approximately 4 ml. are collected and optical densities thereof are read at 280 m$\mu$ with a Beckman DU spectrophotometer. Fractions of eluent corresponding to peaks of optical density are pooled and lyophilized to yield a dry, powdery material.

It has been found that an initial protein peak emerges within the void volume of the poured column of dextran gel. Additionally, a substantial amount of protein material is retained by the gel and emerges as a second peak during the further elution with purified water. Good separation into lower and higher molecular weight materials is obtained with about 0.05 molar ammonia aqueous solution and about 0.05 molar aqueous solution of ammonia containing sodium or potassium ions. The separation that is obtained in stronger ammoniacal solutions and in 0.05 molar acetic acid aqueous solution containing magnesium or calcium ions is poor in that two or three poorly resolved peaks are obtained. Hence, the overall results of the inventive process are to supply hitherto unknown biologically active bovine growth hormones of varying molecular size as will be hereinafter set forth.

The following examples set forth how to perform the invention and illustrate the best mode contemplated of carrying out the invention but are not to be construed as limiting.

EXAMPLE 1

30 mg. of bovine growth hormone was dissolved in 3 ml. of 0.05 M ammonia and the solution was allowed to stand at about 25° C. for approximately 2 hours. The solution was then applied to a column of cross-linked dextran having a water regain value of about 2.5 gm./gm. and washed into the column bed with two consecutive 3 ml. portions of purified water. Thereafter, additional amounts of purified water were allowed to flow through the column at a flow rate of about 1 ml./minute to yield fractional eluates of 4 ml. each. Optical densities of the individual eluates were read at 280 m$\mu$ with a Beckman DU spectrophotometer. Fractional eluates corresponding to peaks of absorbence were combined and lyophilized with results as follows:

| Tube No. | | Volume of Eluate | Dry Solid Weight |
|---|---|---|---|
| (A) | 0 to 17 | 70 ml | Negligible. |
| (B) | 18 to 22 | 70 to 90 ml | 18 mg. |
| (C) | 23 to 30 | 90 to 120 ml | 6 mg. |

Somatotropic activity for fractions (B) and (C) was determined by the rat tibia assay of Greenspan et al., Endocrinol. 45: 455 (1949).

GROWTH HORMONE ASSAY OF FRACTIONS (B) AND (C) FROM SEPHADEX GEL EXCLUSION CHROMATOGRAPHY

| Sample | No. of Rats | Dose/Rat ($\mu$g.) | Tibia Width micra |
|---|---|---|---|
| Control | 7 | None | 147 |
| (B) | 7 | 160 | 286 |
| (C) | 7 | 160 | 246 |

Polyacrylamide gel electrophoresis was carried out with the standard gels described by Ornstein et al. in "Disc Electrophoresis," Distillation Products Industries, Rochester, New York, 1962. The electropherograms were essentially identical in respect to each other and the starting material. In all cases a distinct pattern of five bands was formed as described by Reusser, Arch. Biochim. Biophys. 106: 410–414 (1964).

Bovine growth hormone anti-serum was prepared and tested for specificity as described by Moudgal and Li, Arch. Biochem. Biophys. 93: 122 (1961). The Ouchterlony Agar Double Diffusion Technique was used for the immunological tests, Arkiv. Kemi B26: 1 (1949). Both fractions (B) and (C) reacted positively with the bovine growth hormone antiserum. A single precipitin band was obtained in each case. These bands and the one formed by starting material were essentially confluent.

Sedimentation studies were carried out in a Spinco Model E ultracentrifuge at 20° C. using a schieren angle of 50°, the products being run as a 1% solution in 0.05 M ammonia containing 0.1 M. KCl.

SEDIMENTATION ANALYSIS

| Sample | Sedimenting Component (Percent of Total) | Apparent Sedimentation Coefficient (±95% Confidence Limits) | Apparent Minimum [1] MW (95% Confidence Limits) |
|---|---|---|---|
| (B) | Slow (8%) | $(1.12\pm0.40)S$ | 6,600 (3,400–10,500) |
|  | Fast (92%) | $(2.99\pm0.07)S$ | 29,000 (28,000–30,000) |
| (C) | Slow (<10%) | [2] | [2] |
|  | Fast 1 (>80%) | $(3.15\pm0.15)S$ | 31,400 (29,000–33,600) |
|  | Fast 2 (<10%) | [2] | [2] |
| Starting hormone | Slow (18%) | $(1.17\pm0.48)S$ | 7,100 (3,200–11,900) |
|  | Fast (82%) | $(2.74\pm0.04)S$ | 25,400 (24,900–26,000) |

[1] Assumption of an unsolvated, spherical particle ($f/f_0=1$).
[2] Present but not well enough resolved.

Acid hydrolyses of the materials were carried out with constant boiling hydrochloric acid for 22 hours at 110° C. in evacuated, sealed tubes. The amino acid composition of the hydrolysates were determined in an automatic Spinco amino acid analyzer as described by Spackman et al., Anal. Chem. 30: 1190 (1958). Tryptophan was determined in the unhydrolyzed material by the method of Bencze and Schmid, Anal. Chem. 29: 1194 (1957). The results were as follows:

RELATIVE AMINO ACID COMPOSITION EXPRESSED IN MOLAR RATIOS

| Amino Acid | Fraction B | Fraction C | BGH Unfractionated |
|---|---|---|---|
| Lysine | 22.9 | 22.7 | 20.9 |
| Histidine | 7.2 | 8.5 | 7.7 |
| Arginine | 22.0 | 21.2 | 19.0 |
| Aspartic acid | 33.7 | 32.5 | 32.9 |
| Threonine | 24.6 | 23.3 | 23.9 |
| Serine | 25.0 | 24.7 | 24.6 |
| Glutamic acid | 46.0 | 43.4 | 45.0 |
| Proline | 15.8 | 14.9 | 14.7 |
| Glycine | 22.0 | 22.0 | 21.8 |
| Alanine | 31.0 | 31.0 | 31.0 |
| Valine | 14.5 | 14.5 | 14.8 |
| Methionine | 8.3 | 7.3 | 8.0 |
| Isoleucine | 12.0 | 10.9 | 11.1 |
| Leucine | 48.2 | 46.1 | 46.5 |
| Tyrosine | 12.9 | 11.9 | 11.8 |
| Phenylalanine | 25.8 | 24.0 | 24.5 |
| Tryptophan |  |  | None |

EXAMPLE 2

30 mg. of bovine growth hormone was dissolved in 3 ml. of 0.05 M ammonia and a sufficient quantity of potassium chloride was added to this solution to provide 0.02 M concentration. The solution was then applied to a column of cross-linked dextran gel having a water regain value of approximately 2.5 gm. per gm. of dry gel. The column volume was the same as that used in Example 1, as was the elution with purified water. Good resolution into two fractional products was obtained as in Example 1 and the biological and physico-chemical assays and tests were similar in all respects to those obtained for the fractional products in Example 1. The sedimentation studies again indicated the existence of biologically active growth hormone of approximate molecular weight 5,000.

What is claimed is:

A process of resolving bovine growth hormone into higher and lower molecular weight fractions which comprises:
 (1) dissolving bovine growth hormone in an aqueous ammonia solution of molarity no higher than about 0.05;
 (2) applying the aqueous solution to cross-linked dextran gel having a water regain value of about 2.5 gm./gm.; and
 (3) serially eluting resolved fractions of bovine growth hormone with purified water and recovering said fractions.

No references cited.

SAM ROSEN, *Primary Examiner.*

LEROY B. RANDALL, *Assistant Examiner.*